United States Patent
Chen et al.

(10) Patent No.: US 11,337,202 B2
(45) Date of Patent: *May 17, 2022

(54) DOWNLINK CONTROL INFORMATION (DCI) DESIGN FOR LOW COST DEVICES

(71) Applicant: QUALCOMM Incorporated, San Diego, CA (US)

(72) Inventors: Wanshi Chen, San Diego, CA (US); Hao Xu, Beijing (CN); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/697,524

(22) Filed: Nov. 27, 2019

(65) Prior Publication Data

US 2020/0100229 A1 Mar. 26, 2020

Related U.S. Application Data

(63) Continuation of application No. 15/818,475, filed on Nov. 20, 2017, now Pat. No. 10,542,530, which is a
(Continued)

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01)

(58) Field of Classification Search
None
See application file for complete search history.

(56) References Cited

U.S. PATENT DOCUMENTS 8,144,712 B2 3/2012 Love et al.
9,826,514 B2 11/2017 Chen et al.
(Continued)

FOREIGN PATENT DOCUMENTS

CN 101810040 A 8/2010
CN 102006657 A 4/2011
(Continued)

OTHER PUBLICATIONS

Samsung "Compact DCI Format for PUSCH Assignments", R1-112516, dated Aug. 26, 2011 (Year: 2011).*
(Continued)

*Primary Examiner* — Jamaal Henson
(74) *Attorney, Agent, or Firm* — Patterson + Sheridan, L.L.P.

(57) ABSTRACT

Certain aspects of the present disclosure relate to techniques for reducing the decoding complexity for low cost devices (e.g., low cost UEs). One technique may include simplifying the PDCCH format. This may include generating a compact DCI format for transmitting DCI to a low cost device. The compact DCI format may correspond to at least one standard DCI format used by a regular UE and may comprise a reduced number of bits when compared to the standard DCI format. Another technique may include reducing the number of blind decodes. This technique may include selecting a set of resources for transmitting DCI from a limited set of decoding candidates, such that a receiving low cost device need only perform blind decodes for the limited set of decoding candidates.

34 Claims, 6 Drawing Sheets

Related U.S. Application Data continuation of application No. 13/676,961, filed on Nov. 14, 2012, now Pat. No. 9,826,514.

(60) Provisional application No. 61/560,337, filed on Nov. 16, 2011.

(56) References Cited

U.S. PATENT DOCUMENTS

| | | | |
|---|---|---|---|
| 2010/0070815 | A1 | 3/2010 | Papasakellariou et al. |
| 2010/0111107 | A1 | 5/2010 | Han et al. |
| 2010/0151874 | A1 | 6/2010 | Cai et al. |
| 2010/0260130 | A1 | 10/2010 | Earnshaw et al. |
| 2011/0019776 | A1 | 1/2011 | Zhang et al. |
| 2011/0075684 | A1 | 3/2011 | Zeng et al. |
| 2011/0085458 | A1* | 4/2011 | Montojo ............ H04W 72/042 370/252 |
| 2011/0103336 | A1 | 5/2011 | Ishii et al. |
| 2011/0171985 | A1* | 7/2011 | Papasakellariou ......................... H04W 72/0453 455/509 |
| 2011/0237283 | A1 | 9/2011 | Shan et al. |
| 2011/0310780 | A1 | 12/2011 | Xiao et al. |
| 2012/0069812 | A1 | 3/2012 | Noh et al. |
| 2012/0195267 | A1 | 8/2012 | Dai et al. |
| 2012/0207103 | A1 | 8/2012 | Dai et al. |
| 2012/0300724 | A1 | 11/2012 | Liu et al. |
| 2012/0314678 | A1 | 12/2012 | Ko et al. |
| 2013/0022005 | A1 | 1/2013 | Yano et al. |
| 2013/0083753 | A1* | 4/2013 | Lee ....................... H04L 1/0026 370/329 |
| 2014/0269594 | A1 | 9/2014 | Jang et al. |
| 2018/0077693 | A1 | 3/2018 | Chen et al. |

FOREIGN PATENT DOCUMENTS

| | | | |
|---|---|---|---|
| JP | 2011211323 | A | 10/2011 |
| JP | 2012512582 | A | 5/2012 |
| JP | 2014531856 | A | 11/2014 |
| WO | 2010114446 | A1 | 10/2010 |
| WO | 2011019962 | A2 | 2/2011 |
| WO | 2011041445 | A1 | 4/2011 |
| WO | 2011044524 | A2 | 4/2011 |
| WO | 2011053051 | A2 | 5/2011 |
| WO | 2011066806 | A1 | 6/2011 |
| WO | 2011085230 | A2 | 7/2011 |
| WO | 2011085542 | A1 | 7/2011 |
| WO | 2011096699 | A2 | 8/2011 |
| WO | 2011105827 | A2 | 9/2011 |
| WO | 2011121774 | A1 | 10/2011 |
| WO | 2011125701 | A1 | 10/2011 |
| WO | 2013049768 | A1 | 4/2013 |

OTHER PUBLICATIONS

Catt: "System Level Evaluation on Compact DCI Formats", R1-113717, 3GPP TSG RAN WG1 Meeting #67,San Francisco, USA, Nov. 14-18, 2011, 2 Pages.

Email Discussion on "DL Control Signalling for Dual-layer Beamforming", LISTSERV 16.5-3GPP_TSG_RAN_WG1 Archives, Apr. 21, 2020, 2 pages.

Mitsubishi Electric: "Multi-Cluster PUSCH Resource Allocation", R1-103238, 3GPP TSG RAN WG1 meeting #61, Montreal, Canada, May 10-14, 2010, 5 Pages.

Motorola: "DCI Formats for Uplink Non-Contiguous RB Allocations", R1-101109, 3GPP TSG RAN1 #60, San Francisco, USA, Feb. 22-26, 2010, 5 Pages.

Motorola: "Transmission modes and Control signalling for UL MIMO", 3GPP TSG-RAN WG1 Meeting #62bis, R1-105628, Oct. 14, 2010, 9 Pages, URL:http://www.3gpp.org/ftp/tsg_ran/WG1_RL1/TSGR1_62b/Docs/R1-105628.zip.

NEC Group: "Remaining Details of DCI Format 2C", R1-105415, 3GPP TSG-RAN WG1 Meeting #62bis, Xian, China, Oct. 11-15, 2010, 5 Pages.

NTT DOCOMO: "Issues Regarding LTE Network for Low Cost MTC", R1-114082, 3GPP TSG RAN WG1 Meeting #67, San Francisco, USA, Nov. 14-18, 2011, 5 Pages.

Samsung: "Compact DCI Design for MU-MIMO", R1-104608, 3GPP TSG RAN WG1 #62, Madrid, Spain, Aug. 23-27, 2010, 3 Pages.

Samsung: "Compact DCI Format for PUSCH Assignments", R1-112516, 3GPP TSG RAN WG1 #66, Athens, Greece, Aug. 22-26, 2011, 4 Pages.

Samsung: "Discussion on Compact DCI Format Design for SU/MU-MIMO", R1-105385, 3GPP TSG RAN WG1 #62bis, Xi'an, China, Oct. 11-15, 2010, 3 Pages.

ZTE: "Discussion on PDCCH with reduced overhead in Rel-11", 3GPP TSG-RAN WG1 #66bis, R1-113004, Oct. 4, 2011, 5 Pages, URL:http://www.3gpp.org/ftp/tsg_ran/WG1_RL1/TSGR1_66b/Docs/R1-113004.zip.

ZTE: "Discussion on PDCCH with Reduced Overhead in Rel-11", R1-113854, 3GPP TSG-RAN WG1 #67, San Francisco, USA, Nov 14-Nov. 18, 2011, 4 Pages.

Catt: "Considerations on Potential Cost Saving for Low-Cost MTC UEs Based on LTE", R1-114341, 3GPP TSG RAN WG1 Meeting #67, San Francisco, USA, Nov. 14-18, 2011, 4 Pages.

Fujitsu: "DCI format padding in LTE", 3GPP TSG-RAN WG1 Meeting #65, R1-111719, May 2011, pp. 1-5.

Fujitsu: "Support of MTC UE having Narrower Rx/Tx Bandwidths than the Serving Cell's", 3GPP TSG-RAN WG1#67 R1-114188, Nov. 9, 2011, pp. 2, http://www.3gpp.org/ftp/tsg_ran/WG1_RL1/TSGR1_67/Docs/R1-114188.zip.

International Preliminary Report on Patentability—PCT/US2012/065161,The International Bureau of WIPO—Geneva, Switzerland, dated May 30, 2014.

International Search Report and Written Opinion—PCT/US2012/065161—ISA/EPO—dated Feb. 14, 2013.

LG Electronics: "Downlink control signaling enhancements in Rel-11 ", 3GPP TSG-RAN WG1#66bis, R1-113266, Oct. 10-14, 2011, 2 pages, http://www.3gpp.org/ftp/tsg_ran/WG1_RL1/TSGR1_66b/Docs/R1-113266.zip.

LG Electronics: "Specification Aspects on Low-Cost MTC", R1-113284, 3GPP TSG RAN WG1 #66bis, Zhuhai, China, Oct. 10-14, 2011, 4 Pages.

Samsung: "Enhancing PDCCH Capacity for CA through Compact DCI Formats", 3GPP TSG-RAN WG1 Meeting #66bis, R1-113072, Oct. 2011, pp. 1-3.

Samsung: "Standards aspects impacting low-cost MTC UEs", 3GPP TSG RAN WG1 #67 R1-114245, Nov. 8, 2011, pp. 1-4.

* cited by examiner

| Field | Legacy Bit-width | New Bit-width | Notes |
|---|---|---|---|
| Carrier Indicator | 0 | 0 | |
| Flag format0/format1A differentiation | 1 | 0 | Either keep it or remove it and have two distinct DCI format sizes 0 and 1A |
| Localized/Distributed VRB assignment flag | 1 | 0 | No hopping for the low bandwidth case |
| Resource allocation | 5 | 2 | Limited resource allocation and MCS |
| MCS | 5 | 2 | |
| HARQ process id | 3 | 0 | Only one H-ARQ process |
| New data indicator | 1 | 1 | Assume H-ARQ is still supported |
| Redundancy version | 2 | 0 | No IR, always RV=0 |
| TPC | 2 | 1 | 1-bit TPC should be sufficient for PUCCH |
| Downlink Assignment Index | 0 | 0 | |
| [SRS Request] | 1 | 0 | No A-SRS support |
| Zero-padding | 0 | 0 | Depending on whether 1A and 0 need to be size-matched |
| CRC | 16 | 12 | Possible reduction of effective CRC length – assume 12 – bit CRC |
| Total: | 37 | 18 | |

FIG. 4

| Field | Legacy Bit-width | New Bit-width | |
|---|---|---|---|
| Carrier Indicator | 0 | 0 | |
| Flag format0/format1A differentiation | 1 | 0 | Either keep it or remove it and have two distinct DCI format sizes 0 and 1A |
| Frequency hopping flag | 1 | 0 | No support of hopping |
| Resource block assignment and hopping resource allocation | 5 | 2 | Limited resource allocation and MCS |
| MCS and RV | 5 | 2 | |
| NDI | 1 | 1 | Assume H-ARQ is still supported |
| TPC command for PUSCH | 2 | 1 | 1-bit TPC should be sufficient |
| Cyclic shift for DM RS and OCC index | 3 | 1 | Reduce to 1-bit |
| UL index (TDD only) or DAI (TDD only) | 0 | 0 | |
| CQI Request | 1 | 0 | Can be removed if only periodic CQI is supported; alternatively, only support aperiodic CQI |
| [SRS Request] | 1 | 0 | No support of A-SRS |
| Multi-cluster flag | 1 | 0 | No support of multi-cluster RA |
| Zero-padding | 0 | 0 | Depending on whether 1A and 0 need to be size-matched |
| CRC | 16 | 12 | Possible reduction of effective CRC length |
| Total: | 37 | 19 | |

DOWNLINK CONTROL INFORMATION (DCI) DESIGN FOR LOW COST DEVICES

The present application is a continuation of U.S. application Ser. No. 15/818,475, entitled "DOWNLINK CONTROL INFORMATION (DCI) DESIGN FOR LOW COST DEVICES", filed on Nov. 20, 2017, which is a continuation of U.S. application Ser. No. 13/676,961, entitled "DOWNLINK CONTROL INFORMATION (DCI) DESIGN FOR LOW COST DEVICES," filed on Nov. 14, 2012 and claims priority to U.S. Provisional Application No. 61/560,337, entitled "DOWNLINK CONTROL INFORMATION (DCI) DESIGN FOR LOW COST DEVICES," filed Nov. 16, 2011, all of which are assigned to the assignee hereof and hereby expressly incorporated by reference herein.

BACKGROUND

Field

Aspects of the present disclosure relate generally to wireless communication systems, and more particularly, to Downlink Control Information (DCI) design for low cost devices.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Certain aspects of the present disclosure provide a method for wireless communications. The method generally includes generating a compact Downlink Control Information (DCI) format for transmitting DCI for use in at least one of uplink (UL) or downlink (DL) transmissions by a first device of a first type, wherein the compact DCI format corresponds to at least one standard DCI format used by a second device of a second type and comprises a reduced number of bits when compared to the at least one standard DCI format; and transmitting the DCI according to the compact DCI format, wherein the DCI comprises DCI for a limited modulation and coding scheme (MCS), and wherein the limited MCS comprises Quadrature Phase Shift Keying (QPSK) with a limited set of transport block sizes.

Certain aspects of the present disclosure provide an apparatus for wireless communications. The apparatus generally includes means for generating a compact Downlink Control Information (DCI) format for transmitting DCI for use in at least one of uplink (UL) or downlink (DL) transmissions by a first device of a first type, wherein the compact DCI format corresponds to at least one standard DCI format used by a second device of a second type and comprises a reduced number of bits when compared to the at least one standard DCI format; and means for transmitting the DCI according to the compact DCI format, wherein the DCI comprises DCI for a limited modulation and coding scheme (MCS), and wherein the limited MCS comprises Quadrature Phase Shift Keying (QPSK) with a limited set of transport block sizes.

Certain aspects of the present disclosure provide an apparatus for wireless communications. The apparatus generally includes at least one processor and a memory coupled to the at least one processor. The at least one processor is generally configured to generate a compact Downlink Control Information (DCI) format for transmitting DCI for use in at least one of uplink (UL) or downlink (DL) transmissions by a first device of a first type, wherein the compact DCI format corresponds to at least one standard DCI format used by a second device of a second type and comprises a reduced number of bits when compared to the at least one standard DCI format; and transmit the DCI according to the compact DCI format, wherein the DCI comprises DCI for a limited modulation and coding scheme (MCS), and wherein the limited MCS comprises Quadrature Phase Shift Keying (QPSK) with a limited set of transport block sizes.

Certain aspects of the present disclosure provide a computer program product for wireless communications. The computer program product generally includes a computer-readable medium comprising code for generating a compact Downlink Control Information (DCI) format for transmitting DCI for use in at least one of uplink (UL) or downlink (DL) transmissions by a first device of a first type, wherein the compact DCI format corresponds to at least one standard DCI format used by a second device of a second type and comprises a reduced number of bits when compared to the at least one standard DCI format; and transmitting the DCI according to the compact DCI format, wherein the DCI comprises DCI for a limited modulation and coding scheme (MCS), and wherein the limited MCS comprises Quadrature Phase Shift Keying (QPSK) with a limited set of transport block sizes.

Certain aspects of the present disclosure provide a method for wireless communications. The method generally includes receiving Downlink Control Information (DCI) according to a compact DCI format for use in at least one of uplink (UL) or downlink (DL) transmissions, wherein the compact DCI format corresponds to at least one standard DCI format used by a second device of a second type and comprises a reduced number of bits when compared to the at least one standard DCI format; and processing the received DCI, wherein the DCI comprises DCI for a limited modulation and coding scheme (MCS), and wherein the limited MCS comprises Quadrature Phase Shift Keying (QPSK) with a limited set of transport block sizes.

Certain aspects of the present disclosure provide an apparatus for wireless communications means for receiving Downlink Control Information (DCI) according to a compact DCI format for use in at least one of uplink (UL) or downlink (DL) transmissions, wherein the compact DCI format corresponds to at least one standard DCI format used by a second device of a second type and comprises a reduced number of bits when compared to the at least one standard DCI format; and means for processing the received DCI, and wherein the DCI comprises DCI for a limited modulation and coding scheme (MCS), and wherein the limited MCS comprises Quadrature Phase Shift Keying (QPSK) with a limited set of transport block sizes.

Certain aspects of the present disclosure provide an apparatus for wireless communications. The apparatus generally includes at least one processor and a memory coupled to the at least one processor. The at least one processor is generally configured to receive Downlink Control Information (DCI) according to a compact DCI format for use in at least one of uplink (UL) or downlink (DL) transmissions, wherein the compact DCI format corresponds to at least one standard DCI format used by a second device of a second type and comprises a reduced number of bits when compared to the at least one standard DCI format; and process the DCI, wherein the DCI comprises DCI for a limited modulation and coding scheme (MCS), and wherein the limited MCS comprises Quadrature Phase Shift Keying (QPSK) with a limited set of transport block sizes.

Certain aspects of the present disclosure provide a computer program product for wireless communications. The computer program product generally includes a computer-readable medium comprising code for receiving Downlink Control Information (DCI) according to a compact DCI format for use in at least one of uplink (UL) or downlink (DL) transmissions, wherein the compact DCI format corresponds to at least one standard DCI format used by a second device of a second type and comprises a reduced number of bits when compared to the at least one standard DCI format; and processing the received DCI, wherein the DCI comprises DCI for a limited modulation and coding scheme (MCS), and wherein the limited MCS comprises Quadrature Phase Shift Keying (QPSK) with a limited set of transport block sizes.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
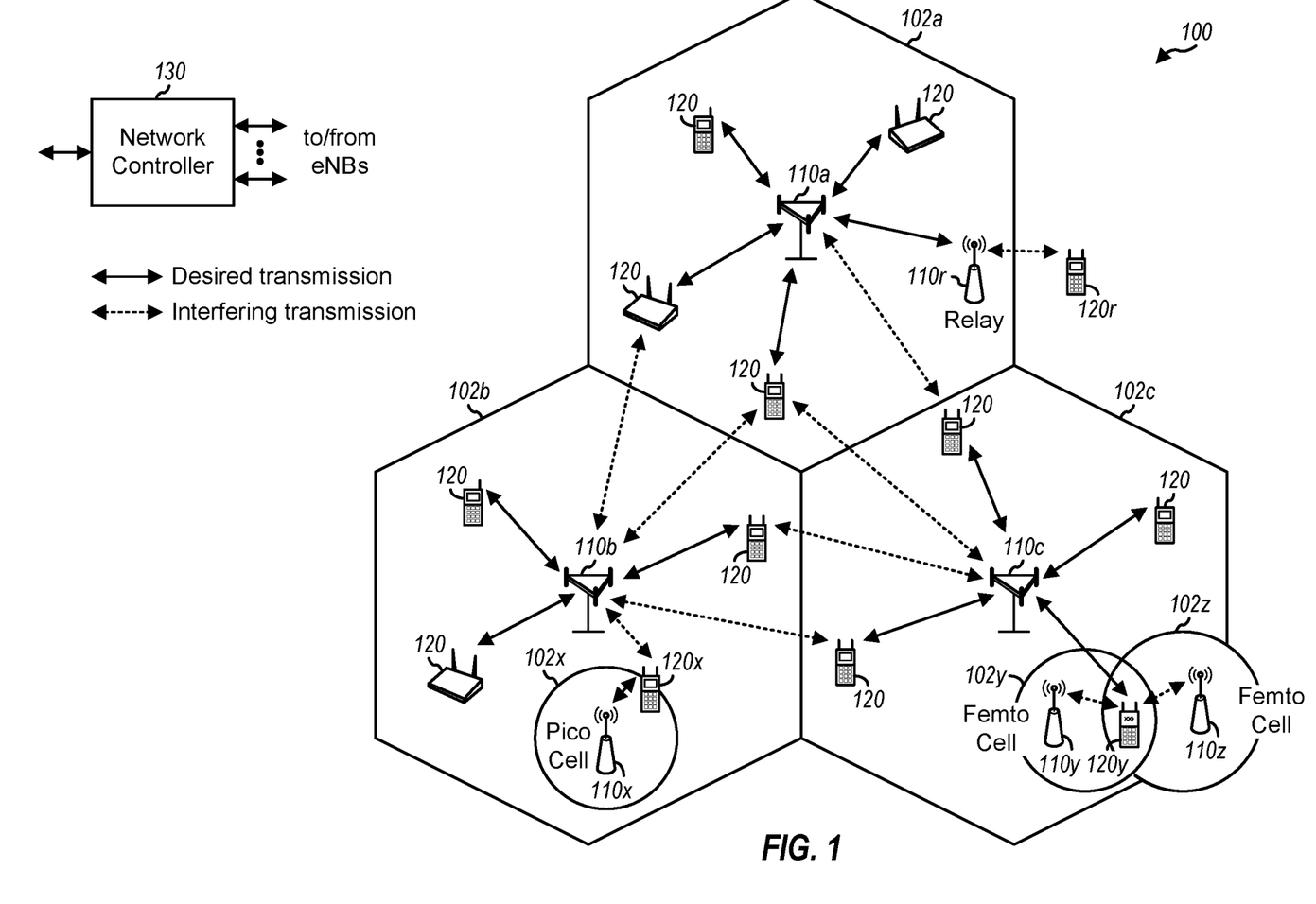
FIG. 1 is a block diagram conceptually illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
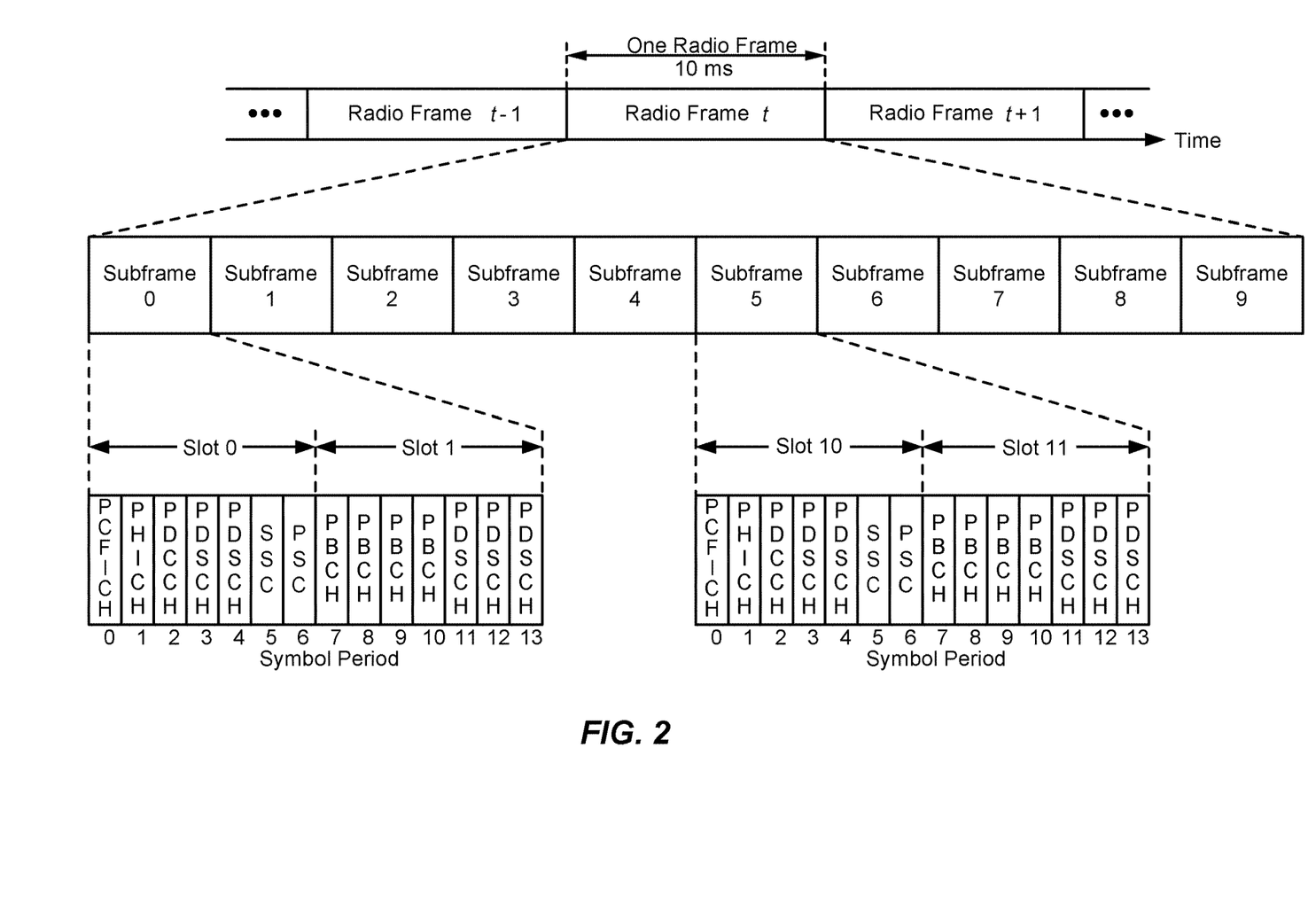
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of sub-frame 0. The PBCH may carry certain system information.

The eNodeB may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
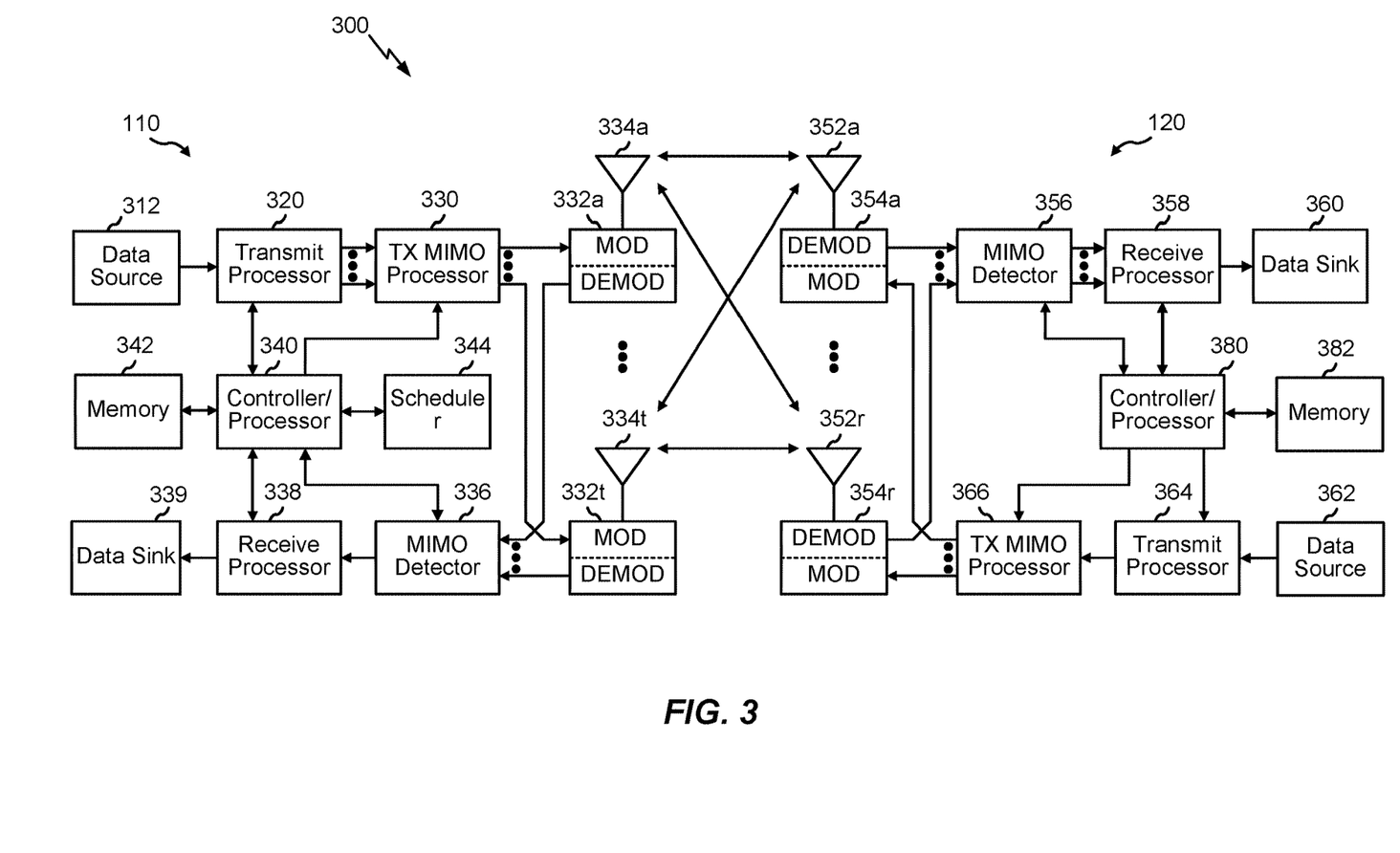
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 380 and/or other processors and modules at the UE 120 may perform or direct operations for blocks 800 in FIG. 8, operations for blocks 1000 in FIG. 10, operations for blocks 1100 in FIG. 11, and/or other processes for the techniques described herein. The memories 342 and 382 may store data and program codes for base station 110 and UE 120, respectively. A scheduler 344 may schedule UEs for data transmission on the downlink and/or uplink.

In LTE, cell identities range from 0 to 503. Synchronization signals are transmitted in the center 62 resource elements (REs) around the DC tone to help detect cells. The synchronization signals comprise two parts: a Primary Synchronization Signal (PSS) and a Secondary Synchronization Signal (SSS).

In one configuration, the base station 110 includes means for generating a compact Downlink Control Information (DCI) format for transmitting DCI for use in at least one of uplink (UL) or downlink (DL) transmissions by a low cost UE, wherein the compact DCI format corresponds to at least one standard DCI format used by a regular UE and comprises a reduced number of bits when compared to the standard DCI format, and means for transmitting the DCI according to the compact DCI format. In one aspect, the aforementioned means may include controller/processor 340, the memory 342, the transmit processor 320, the modulators 332, and the antennas 334, or a combination thereof, configured to perform the functions recited by the aforementioned means. In another aspect, an aforementioned means may include a module or any apparatus configured to perform the functions recited by the aforementioned means.

In one configuration, the UE 120 (e.g., low cost UE) includes means for receiving the DCI for at least one of uplink (UL) or downlink (DL) transmissions, transmitted according to the compact DCI format, wherein the DCI comprises a reduced number of bits when compared to a standard DCI format, and means for processing the DCI. In one aspect, the aforementioned means may include the controller/processor 380, the memory 382, the receive processor 358, the MIMO detector 356, the demodulators 354, and the antennas 352, or a combination thereof, configured to perform the functions recited by the aforementioned means. In another aspect, an aforementioned means may include a module or any apparatus configured to perform the functions recited by the aforementioned means.

Example DCI Design For Low Cost Devices

In LTE Rel-8/9/10, each PDCCH follows downlink control information (DCI) format. Downlink (DL) grant DCI formats may include DCI formats 1, 1A, 1B, 1D, 2, 2A, 2B and 2C. Uplink (UL) DCI grant DCI formats may include DCI formats 0 and 4. Broadcast/multicast DCI formats may include DCI formats 1C, 3 and 3A.

In certain aspects, each DCI format contains a 16-bit Cyclic Redundancy Check (CRC), which is masked by an identifier (ID) (e.g. UE-specific ID or a broadcast/multicast ID). In an aspect, the size of the DCI may depend on the system bandwidth, system type (e.g. Frequency division Duplex (FDD) or Time Division Duplex (TDD)), number of common reference signal (CRS) antenna ports, DCI format, carrier aggregation or not, etc. The size of the DCI is typically tens of bits (e.g. 30-70 bits) including CRC. In addition, a UE may need to perform blind decodes to determine whether there is one or more PDCCHs addressed to it or not. In an aspect, the number of blind decodes may be up to 44 in LTE Rel-8 and 9, and up to 60 in LTE Rel-10, when UL MIMO is configured.

In Rel-11 and beyond, low cost devices (e.g., low cost UE) may be supported. Generally, low cost devices are meant for machine type communications, and cost lower and have reduced processing capabilities when compared to regular UEs. In certain aspects, these low cost devices may operate in small system bandwidth cells, and may be expected to have less processing power. In certain aspects, scheduling flexibility, channel exploitation (e.g., MCS), resource allocation flexibility, etc., are relatively less important for low cost devices than regular UEs.

In certain aspects, maintaining the same PDCCH design as regular UEs for low cost UEs may result in a decoding complexity, which the low cost device may not be capable of handling. Certain aspects of the present disclosure discuss techniques for reducing the decoding complexity for low cost devices (e.g., low cost UEs). One technique may include simplifying the PDCCH format to save the low cost device from large amount of processing. This may be accomplished by generating a compact DCI format for transmitting DCI to a low cost device. The compact DCI format may correspond to at least one standard DCI format used by a regular UE and may comprise a reduced number of bits when compared to the standard DCI format. Another technique may include reducing the number of blind decodes (discussed above) in order to reduce the amount of processing by the low cost device. This technique may include selecting a set of resources for transmitting DCI from a limited set of decoding candidates, such that a receiving low cost device need only perform blind decodes for the limited set of decoding candidates.

As noted above, in accordance with the first technique, the size of a DCI format may be reduced, for example, to achieve better PDCCH overhead efficiency, while having limited impact on scheduling, resource allocation, channel utilization, flexibility and the like.

In certain aspects, a DCI design for low cost devices may include DCI design with limited resource allocation. For example, for a small system bandwidth (e.g., 6 resource blocks RBs) monitored by a low cost UEs, the DCI may allocate resources for one user at a time. In this case no resource allocation information field may be needed in the DCI, and thus, the DCI may be generated without bits allocated for the resource allocation information.

In an alternative aspect, the DCI may be generated with limited set of resource allocation possibilities. For example, considering a 6 RB system, and assuming that 4 RBs are available for data and 2 other RBs are available for control signalling, only 3 possible resource allocations may be allowed, for example, all 4 RBs, the top 2 RBs, and the bottom 2 RBs. This would require only 2 bits for resource allocation and may thus lead to a saving of 2 bits, compared to fully flexible resource allocation in a regular DCI format.

In certain aspects, a DCI design for low cost devices may include DCI with limited modulation and coding schemes (MCS). For instance, only QPSK, along with a limited set of possible coding rates (hence a limited set of transport block sizes) may be allowed. For example, 4 possibilities may need 2 bits in the DCI design, which may lead to a saving of 3 bits from the current LTE design.

In certain aspects, a DCI design for low cost devices may include DCI with limited Hybrid Automatic Repeat Request (HARQ) processes. In an aspect, a limited set of H-ARQ processes may be allowed. For example, only one H-ARQ process may be allowed requiring no HARQ information field (e.g., for indicating a HARQ process) in the DCI. This may lead to a saving of 3 bits in frequency division duplex (FDD) and 4 bits in time division duplex (TDD).

In LTE Rel-8/9/10, DCI formats 1A and 0 have the same size, and one bit is used in the DCI to differentiate between the two formats. In certain aspects, this bit may be removed (e.g., for overhead efficiency) if the formats 1A and 0 are required to have different sizes. Thus, a DCI design for low cost devices may include DCI with no 1-bit flag differentiating DCI formats 1A and 0.

In certain aspects, a DCI design for low cost devices may include DCI design with reduced CRC length. For instance, 8-bit CRC (instead of the regular 16-bit CRC) may be used, as in the aperiodic channel quality indicator (CQI) case in LTE. Alternatively, the same 16-bit CRC generator polynomial as in LTE may be used, but after applying some truncation. For example, after the 16-bit CRC is generated, it may be truncated to K<16 bits. The truncated CRC may be appended to the transmit information bits and further masked by the K LSB bits of the Radio Network Temporary Identifier (RNTI).

In certain aspects, a DCI design for low cost devices may include DCI without bits allocated for incremental redundancy. This may include always assuming redundancy version (RV)=0, which may lead to a saving of 2 bits.

In certain aspects, a DCI design for low cost devices may include DCI without bits allocated for aperiodic sounding reference signal (SRS) request. This may lead to a saving of one bit.

In certain aspects, a DCI design for low cost devices may include DCI with reduced bit-width for transmitter power control TPC. In an aspect, instead of 2-bit TPC commands, 1-bit may be used, which may be sufficient for low cost devices.

In certain aspects, a DCI design for low cost devices may include DCI with reduced cyclic shift bit-width for Demodulation Reference Signal (DM-RS). In certain aspects, instead of 3 bits, 1-bit may be used to indicate two values.

In certain aspects, a DCI design for low cost devices may include DCI without a bit allocated for multi-cluster flag. This may lead to a saving of 1 bit.

In certain aspects, the aperiodic CSI may be kept only if needed, for example if periodic CSI is not supported. In an aspect, in certain cases only periodic CSI may be supported and the 1-bit aperiodic CSI may be removed. Thus, a DCI design for low cost devices may include DCI without the one bit allocated for aperiodic CSI. In an aspect, a low cost UE may determine whether periodic CSI is supported. The low cost UE may keep aperiodic CSI if periodic CSI is not supported, and remove aperiodic CSI if periodic CSI is supported.

In certain aspects, the localized/distributed virtual resource block (VRB) assignment flag may be removed. Thus, a DCI design for low cost devices may include DCI without one bit allocated for the localized/distributed VRB assignment flag.

In certain aspects, low cost UEs may be always required to hop or never hop. Thus, a DCI design for the low cost devices may include DCI without one bit allocated for the frequency hopping flag (typically used to indicate hop or no hop).

In certain aspects, the Downlink Assignment Index (DAI) and UL assignment index (TDD) may be removed. In an aspect, this may be accomplished by ensuring that there is always a one-to-one DL subframe to UL subframe mapping (e.g., for H-ARQ operation) for each UE, such that the need for DAI (e.g., due to multiple DL to one UL mapping) or UL assignment index (e.g., due to one DL to multiple UL mapping) is removed. Thus, a DCI design for low cost devices may include DCI without a bit allocated for DAI and UL assignment index.

In certain aspects, for different UEs, the mapping for DL subframe and UL subframe may be different for better load balancing. For example, for a UE 1, DL subframe x may be mapped to UL subframe y, and for UE 2, DL subframe z may be mapped to UL subframe y. Thus, UL subframe y maps to different DL subframes (x and z) for the two UEs. In an aspect, the DL subframe to UL subframe mapping may be indicated to the low cost device(s) via Radio Resource Control (RRC) signaling.

Figure 4:
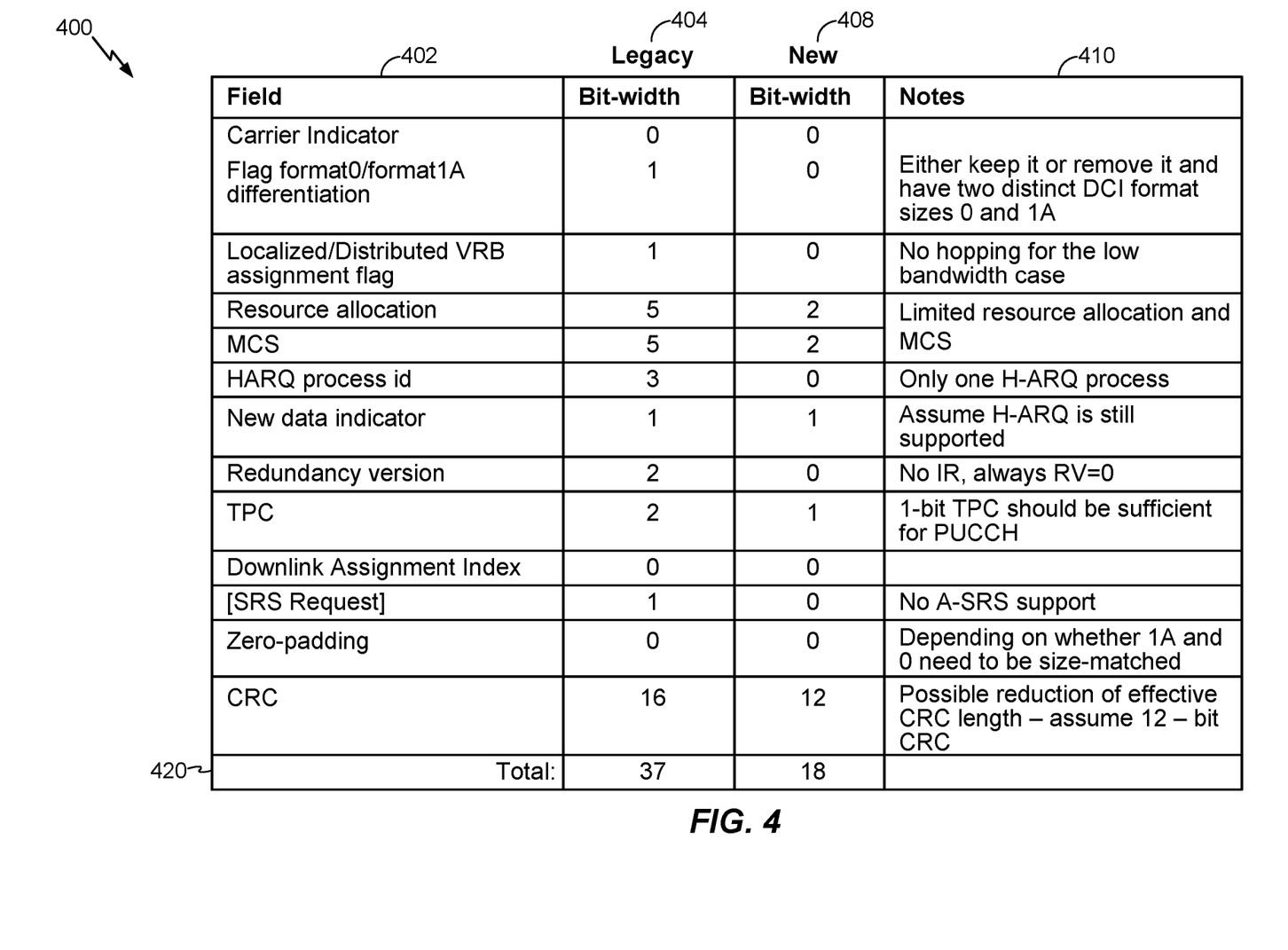
FIG. 4 illustrates an example comparison of legacy DCI format 1A and corresponding compact DCI format, in accordance with certain aspects of the disclosure.

FIG. 4 illustrates an example comparison 400 of legacy DCI format 1A and corresponding compact DCI format, in accordance with certain aspects of the disclosure. Column 402 lists the fields for the DCI format 1A. Column 404 lists bit-widths for each field of legacy DCI format 1A and column 408 lists bit-widths for each field of the compact DCI design for DCI format 1A, compacted using the techniques discussed above. Column 410 discusses the specific technique used for each field 402 for reducing the number of bits in the compact DCI design.

Row 420 shows a total number of bits required for DCI according to legacy DCI format 1A and the compact DCI format 1A. As shown in FIG. 4, DCI according to the legacy DCI format 1A requires 37 bits. However, DCI according to the compacted DCI format 1A, by employing techniques discussed above, requires only 18 bits, which is a saving of more than 50% of PDCCH overhead.

Figure 5:
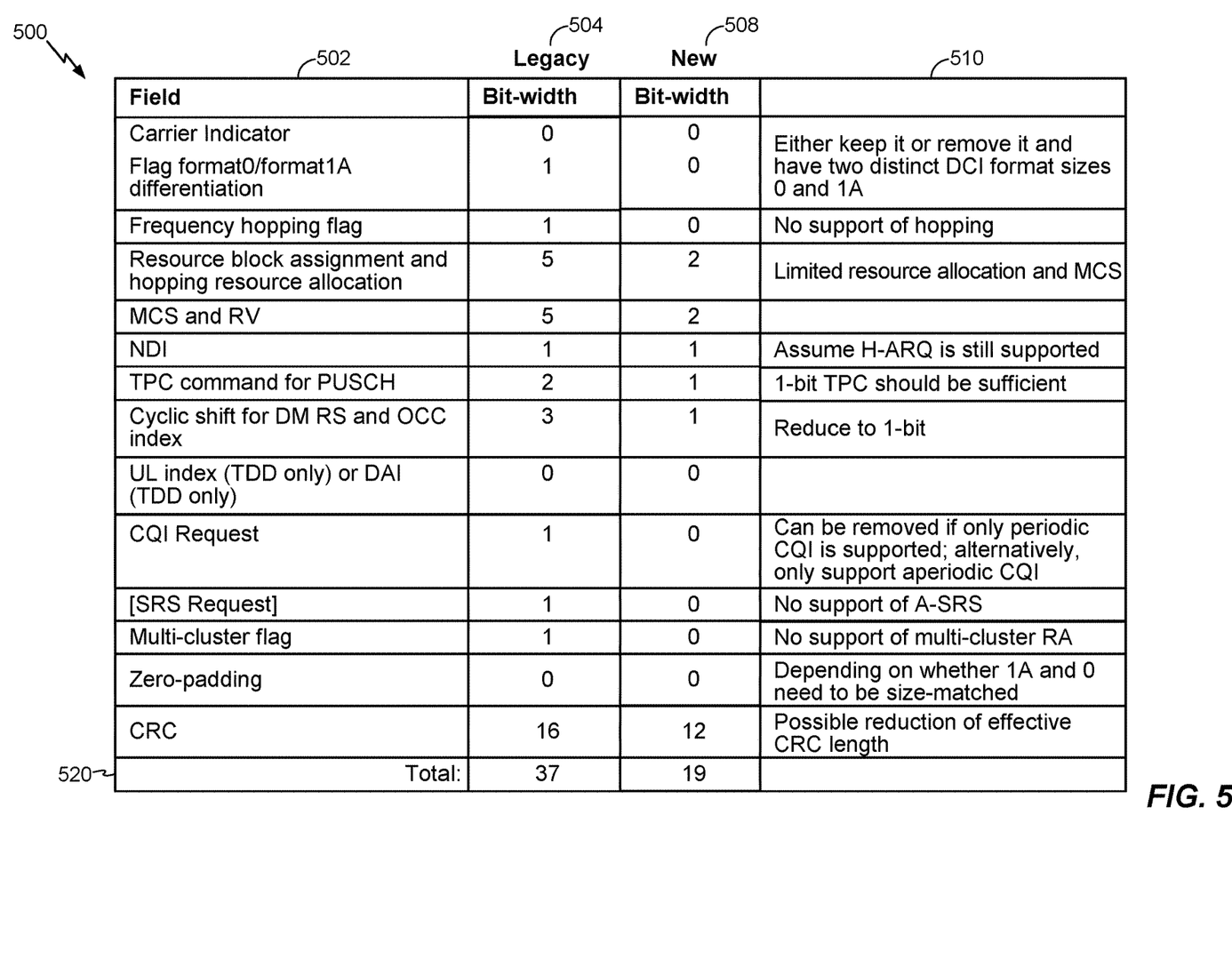
FIG. 5 illustrates an example comparison of legacy DCI format 0 and corresponding compact DCI format, in accordance with certain aspects of the disclosure.

FIG. 5 illustrates an example comparison 500 of legacy DCI format 0 and corresponding compact DCI format, in accordance with certain aspects of the disclosure. Column 502 lists the fields for the DCI format 0. Column 504 lists bit-widths for each field of the legacy DCI format 0 and column 508 lists bit-widths for each field of the compact DCI design for DCI format 0, compacted using the techniques discussed above. Column 510 discusses the specific technique used for each field 502 for reducing the number of bits in the compact DCI design.

Row 520 shows a total number of bits required for DCI according to the legacy DCI format 0 and the compact DCI format 0. As shown in FIG. 5, the DCI according to legacy format 0 requires 37 bits. However, DCI according to the compacted format 0, by employing techniques discussed above, requires only 19 bits, which is a saving of close to 50% of PDCCH overhead.

Figure 6:
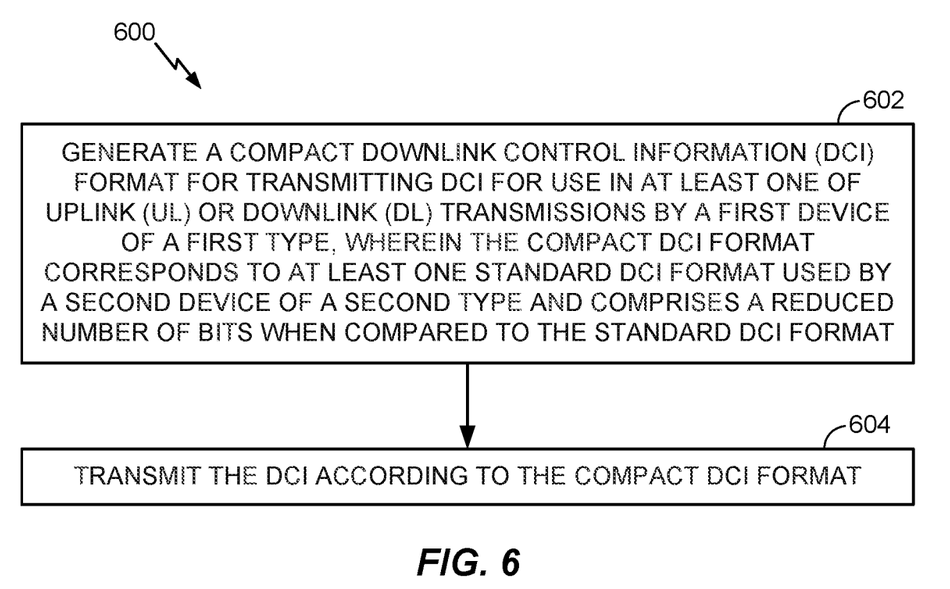
FIG. 6 illustrates example operations, which may be performed by a base station (BS), for generating DCI in accordance with certain aspects of the disclosure.

FIG. 6 illustrates example operations 600, which may be performed by a base station (BS), for generating DCI in accordance with certain aspects of the disclosure. Operations 600 may begin, at 602, by generating a compact DCI format for transmitting DCI for use in at least one of UL or DL transmissions by a first device of a first type, wherein the compact DCI format corresponds to at least one standard DCI format used by a second device of a second type and comprises a reduced number of bits when compared to the standard DCI format. At 604, the BS may transmit the DCI according to the compact DCI format. In an aspect, the device of the first type may include a low cost device (e.g., low cost UE) and a device of a second type may include a regular UE. Further, as noted above, the low cost UE may comprise reduced processing capability when compared to the regular UE. In an aspect the BS may include eNB 110.

Figure 7:
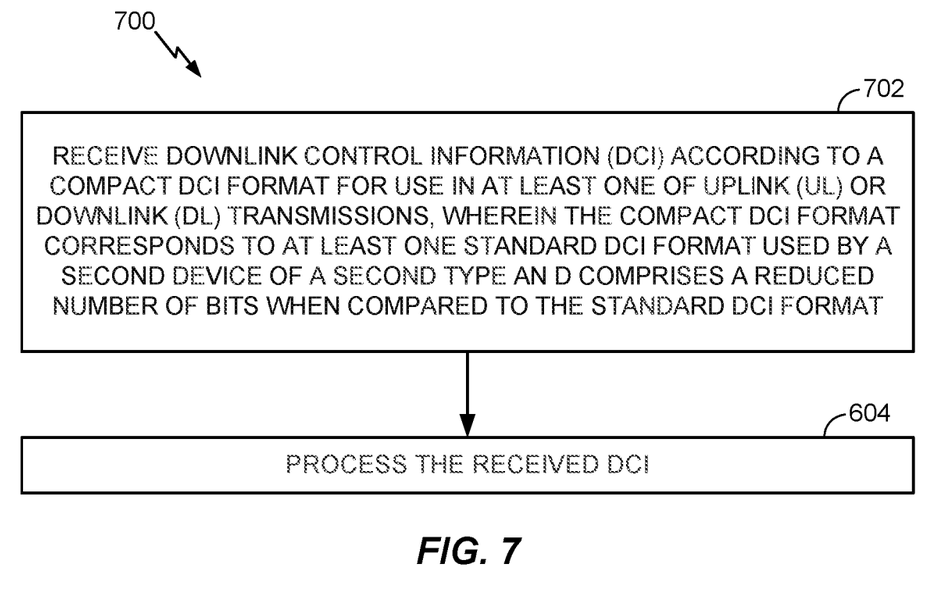
FIG. 7 illustrates example operations, which may be performed by a user equipment (UE) (e.g., a low cost UE), for receiving and processing DCI in accordance with certain aspects of the disclosure.

FIG. 7 illustrates example operations 700, which may be performed by a user equipment (UE) (e.g., a low cost UE), for receiving and processing DCI in accordance with certain aspects of the disclosure. Operations 700 may begin, at 702, receiving DCI according to a compact DCI format for use in at least one of UL or DL transmissions, wherein the compact DCI format corresponds to at least one standard DCI format used by a second device of a second type, and comprises a reduced number of bits when compared to the standard DCI format. At 704, the UE may process the received DCI. In an aspect, the device of the first type may include a low cost device (e.g., low cost UE) and a device of a second type may include a regular UE. Further, as noted above, the low cost UE may comprise reduced processing capability when compared to the regular UE. In an aspect the UE may include UE 120.

In certain aspects, as noted above, another technique for reducing decoding complexity at a low cost UE may include reducing the number of blind PDCCH decodes in order to reduce the amount of processing by the low cost device. As noted above, this technique may include selecting a set of resources for transmitting DCI from a limited set of decoding candidates, such that a receiving low cost device need only perform blind decodes for the limited set of decoding candidates.

In an aspect, in addition to lesser decoding complexity, the number of blind decodes may be reduced for less power consumption, and/or for potentially lesser PDCCH payload size. In an aspect, the number of blind PDCCH decodes may be significantly reduced. For example, for 6 RBs, even with good channel conditions, the number of PDCCHs may be limited to, for e.g., four decoding candidates, if MU-MIMO is adopted for PDSCH and there are 2 RBs for PDCCH. The four decoding candidates may include 2 RBs-port 7, 2 RBs-port 8, 1 RB-port 7, and 1 RB-port 7. In this case, the number of blind decodes is $\frac{1}{11}^{th}$ of the original 44 blind decodes. In an aspect, the lesser number of blind decodes may also enable a shorter CRC length.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or various combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
   generating downlink control information (DCI) according to a compact DCI format used for at least one of uplink (UL) or downlink (DL) communications by a first device of a first type, wherein the compact DCI format corresponds to at least one standard DCI format used by a second device of a second type and comprises a reduced number of bits when compared to the at least one standard DCI format; and
   transmitting the DCI according to the compact DCI format, wherein the DCI comprises DCI for a limited set of resource allocation possibilities and lacks a bit allocated for a frequency hopping flag.

2. The method of claim 1, wherein the first device of the first type comprises reduced processing capability when compared to the second device of the second type.

3. The method of claim 1, wherein the first device comprises a low cost User Equipment (UE).

4. The method of claim 1, wherein generating the DCI comprises generating the DCI without bits allocated for resource allocation information, wherein the DCI allocates resources for one user at a time.

5. The method of claim 1, wherein:
   generating the DCI comprises generating the DCI for a limited set of Hybrid Automatic Repeat Request (HARQ) processes, and
   the DCI lacks an indication of a HARQ process.

6. The method of claim 1, wherein generating the DCI comprises generating the DCI without a bit allocated for differentiating between DCI formats 1A and 0, wherein the DCI formats 1A and 0 have different sizes.

7. The method of claim 1, wherein:
   generating the DCI comprises generating a reduced length cyclic redundancy check (CRC) for the DCI, and
   generating the reduced length CRC comprises generating a CRC of a first length and truncating the CRC of the first length to generate the reduced length CRC.

8. The method of claim 1, wherein generating the DCI comprises at least one of:
   generating the DCI without bits allocated for redundancy version (RV), or generating the DCI without bits allocated for sounding reference signal (SRS) request.

9. The method of claim 1, wherein:
the DCI comprises DCI for a limited modulation and coding scheme (MCS), and
the limited MCS comprises Quadrature Phase Shift Keying (QPSK) with a limited set of transport block sizes.

10. The method of claim 1, wherein generating the DCI comprises at least one of:
generating the DCI with reduced bit-width for transmitter power control (TPC); or
generating the DCI with reduced bit-width for demodulation deference signal (DM-RS).

11. The method of claim 1, wherein the DCI lacks a bit allocated for a multi-cluster flag, or the DCI lacks a bit allocated for Virtual Resource Block assignment.

12. The method of claim 1, further comprising:
determining whether periodic channel state information (CSI) is supported;
keeping aperiodic CSI if periodic CSI is not supported based on the determination; and
removing aperiodic CSI if periodic CSI is supported based on the determination.

13. The method of claim 1, wherein the DCI lacks a bit allocated for downlink assignment index (DAI) or UL assignment index, wherein a one to one mapping is maintained between DL subframe and UL subframe for each UE.

14. The method of claim 1, further comprising:
selecting a set of resources for transmitting the DCI from a limited set of decoding candidates; and
transmitting the DCI using the set of resources, such that a receiving UE need only perform blind decodes for the limited set of decoding candidates.

15. A method for wireless communications by a first device of a first type, comprising:
receiving downlink control information (DCI) according to a compact DCI format used for at least one of uplink (UL) or downlink (DL) communications, wherein the compact DCI format corresponds to at least one standard DCI format used by a second device of a second type and comprises a reduced number of bits when compared to the at least one standard DCI format; and
processing the received DCI according to the compact DCI format, wherein the received DCI comprises DCI for a limited set of resource allocation possibilities and lacks a bit allocated for a frequency hopping flag.

16. The method of claim 15, wherein the first device of the first type comprises reduced processing capability when compared to the second device of the second type.

17. The method of claim 15, wherein the first device comprises a low cost user equipment (UE).

18. The method of claim 15, wherein the DCI lacks bits allocated for resource allocation information, and wherein the DCI allocates resources for one user at a time.

19. The method of claim 15, wherein:
the DCI comprises DCI for a limited set of hybrid automatic repeat request (HARQ) processes, and
the DCI lacks an indication of a HARQ process.

20. The method of claim 15, wherein the DCI lacks a bit allocated for differentiating between DCI formats 1A and 0, wherein the DCI formats 1A and 0 have different sizes.

21. The method of claim 15, wherein:
the DCI comprises a reduced length cyclic redundancy check (CRC) for the DCI, and
the reduced length CRC comprises a CRC generated by generating a CRC of a first length and truncating the CRC of the first length to generate the reduced length CRC.

22. The method of claim 15, wherein the DCI lacks at least one of:
bits allocated for redundancy version (RV), or
bits allocated for sounding reference signal (SRS) request.

23. The method of claim 15, wherein:
the DCI comprises DCI for a limited modulation and coding scheme (MCS), and
the limited MCS comprises Quadrature Phase Shift Keying (QPSK) with a limited set of transport block sizes.

24. The method of claim 15, wherein the DCI comprises at least one of:
DCI with reduced bit-width for transmitter power control (TPC), or
DCI with reduced bit-width for demodulation reference signal (DM-RS).

25. The method of claim 15, wherein the DCI lacks a bit allocated for multi-cluster flag, or the DCI lacks a bit allocated for Virtual Resource Block assignment.

26. The method of claim 15, wherein the DCI comprises:
DCI with aperiodic channel state information (CSI) if periodic CSI is not supported, and
DCI without aperiodic CSI if periodic CSI is supported.

27. The method of claim 15, wherein the DCI lacks a bit allocated for downlink assignment index (DAI) or UL assignment index, wherein a one to one mapping is maintained between DL subframe and UL subframe for each UE.

28. The method of claim 15, wherein:
the DCI is transmitted using a set of resources selected from a limited set of decoding candidates; and
the method further comprises performing blind decodes for the limited set of decoding candidates to detect a downlink control channel containing the DCI.

29. An apparatus for wireless communications, comprising:
at least one processor;
memory coupled with the at least one processor, the memory storing instructions executable by the at least one processor to cause the apparatus to:
generate downlink control information (DCI) according to a compact DCI format used for least one of uplink (UL) or downlink (DL) communications by a first device of a first type, wherein the compact DCI format corresponds to at least one standard DCI format used by a second device of a second type and comprises a reduced number of bits when compared to the at least one standard DCI format; and
transmit the DCI according to the compact DCI format, wherein the DCI comprises DCI for a limited set of resource allocation possibilities and lacks a bit allocated for a frequency hopping flag.

30. An apparatus for wireless communications by a first device of a first type, comprising:
at least one processor;
memory coupled with the at least one processor, the memory storing instructions executable by the at least one processor to cause the apparatus to:
instructions stored in the memory and executable by the at least one processor to cause the apparatus to:
receive downlink control information (DCI) according to a compact DCI format used for at least one of uplink (UL) or downlink (DL) communications, wherein the compact DCI format corresponds to at least one standard DCI format used by a second device of a second type and comprises a reduced number of bits when compared to the at least one standard DCI format; and process the received DCI according to the compact DCI format, wherein the received DCI comprises DCI for a limited set of resource allocation possibilities and lacks a bit allocated for a frequency hopping flag.

31. An apparatus for wireless communication comprising:

means for generating downlink control information (DCI) according to a compact DCI format used for least one of uplink (UL) or downlink (DL) communications by a first device of a first type, wherein the compact DCI format corresponds to at least one standard DCI format used by a second device of a second type and comprises a reduced number of bits when compared to the at least one standard DCI format; and means for transmitting the DCI according to the compact DCI format, wherein the DCI comprises DCI for a limited set of resource allocation possibilities and lacks a bit allocated for a frequency hopping flag.

32. An apparatus for wireless communications by a first device of a first type, comprising:

means for receiving downlink control information (DCI) according to a compact DCI format used for at least one of uplink (UL) or downlink (DL) communications, wherein the compact DCI format corresponds to at least one standard DCI format used by a second device of a second type and comprises a reduced number of bits when compared to the at least one standard DCI format; and means for processing the received DCI according to the compact DCI format, wherein the received DCI comprises DCI for a limited set of resource allocation possibilities and lacks a bit allocated for a frequency hopping flag.

33. A non-transitory computer readable medium storing computer executable code thereon for wireless communication comprising code for:

generating downlink control information (DCI) according to a compact DCI format used for least one of uplink (UL) or downlink (DL) communications by a first device of a first type, wherein the compact DCI format corresponds to at least one standard DCI format used by a second device of a second type and comprises a reduced number of bits when compared to the at least one standard DCI format; and transmitting the DCI according to the compact DCI format, wherein the DCI comprises DCI for a limited set of resource allocation possibilities and lacks a bit allocated for a frequency hopping flag.

34. A non-transitory computer readable medium storing computer executable code thereon for wireless communication by a first device of a first type comprising code for:

receiving downlink control information (DCI) according to a compact DCI format used for at least one of uplink (UL) or downlink (DL) communications, wherein the compact DCI format corresponds to at least one standard DCI format used by a second device of a second type and comprises a reduced number of bits when compared to the at least one standard DCI format; and processing the received DCI according to the compact DCI format, wherein the received DCI comprises DCI for a limited set of resource allocation possibilities and lacks a bit allocated for a frequency hopping flag.

* * * * *